(12) United States Patent
Lai et al.

(10) Patent No.: US 7,482,300 B2
(45) Date of Patent: *Jan. 27, 2009

(54) HIGH ACTIVITY ZSM-48 AND METHODS FOR DEWAXING

(75) Inventors: Wenyih F. Lai, Bridgewater, NJ (US); Terry E. Helton, Bethlehem, PA (US); Dominick N. Mazzone, Wenonah, NJ (US)

(73) Assignee: Exxonmobil Research and Engineering Company, Annandale, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/636,288

(22) Filed: Dec. 8, 2006

(65) Prior Publication Data

US 2007/0131581 A1 Jun. 14, 2007

Related U.S. Application Data

(60) Provisional application No. 60/749,809, filed on Dec. 13, 2005.

(51) Int. Cl.
*B01J 29/06* (2006.01)

(52) U.S. Cl. .......................... 502/60; 502/77
(58) Field of Classification Search ............. 502/60, 502/77
See application file for complete search history.

(56) References Cited

U.S. PATENT DOCUMENTS

| | | | |
|---|---|---|---|
| 4,375,573 A | 3/1983 | Young | |
| 4,397,827 A | 8/1983 | Chu | |
| 4,423,021 A | 12/1983 | Rollmann et al. | |
| 4,448,675 A | 5/1984 | Chu | |
| 4,585,747 A * | 4/1986 | Valyocsik | 502/62 |
| 4,599,162 A | 7/1986 | Yen | |
| 5,075,269 A | 12/1991 | Degnan et al. | |
| 5,614,079 A | 3/1997 | Farnos et al. | |
| 5,961,951 A | 10/1999 | Kennedy et al. | |
| 6,884,339 B2 | 4/2005 | Benazzi et al. | |
| 6,923,949 B1 | 8/2005 | Lai et al. | |
| 7,261,805 B2 * | 8/2007 | Grove et al. | 208/49 |
| 2004/0232047 A1 | 11/2004 | Benazzi et al. | |

FOREIGN PATENT DOCUMENTS

| | | |
|---|---|---|
| EP | 0 142 317 | 5/1985 |
| EP | 0 142 317 A2 | 5/1985 |
| WO | WO 94/13583 | 6/1994 |
| WO | WO 01/64339 A1 | 9/2001 |

OTHER PUBLICATIONS

Song-Ho Lee, et al., "Reinvestigation into the synthetis of zeolites using diquaternary alkylammonium ions $(CH_3)_3N^+(CH_2)_nN^+(CH_3)_3$ with n=3-10 as structure-directing agents" Elsevier Inc. Microporous and Mesoporous Materials, 68 (2004) 97-104.

A. Moini, et al., "The role of diquaternary cations as directing agents in zeolite synthesis" 1994 Butterworth-Heinemann, Zeolites, 1994, vol. 14, September/October.

* cited by examiner

*Primary Examiner*—Elizabeth D Wood
(74) *Attorney, Agent, or Firm*—Lawrence E. Carter (57) ABSTRACT

This invention relates to a high activity ZSM-48. More particularly, a high activity ZSM-48 with defined purity is prepared, the ZSM-48 being free of non-ZSM-48 seed crystals and ZSM-50.

19 Claims, 4 Drawing Sheets

◆ = ZSM-48 with $SiO_2:Al_2O_3$ ratio of about 200

■ = ZSM-48 with $SiO_2:Al_2O_3$ ratio according to an embodiment of the invention

HIGH ACTIVITY ZSM-48 AND METHODS FOR DEWAXING

This application claims the benefit of U.S. Provisional application 60/749,809 filed Dec. 13, 2005.

FIELD OF THE INVENTION

This invention relates to a high activity ZSM-48. More particularly, a high activity ZSM-48 with defined purity is prepared, the ZSM-48 being free of non-ZSM-48 seed crystals.

BACKGROUND OF THE INVENTION

The demand for high quality basestocks for formulation into engine oils and other lubricating needs is increasing due to heightened environmental concerns. Basestocks quality is being impacted by demands for basestocks that meet Group II or Group III requirements. Thus there is pressure for producing basestocks that meet the requirements of viscosity index (VI), viscosity, pour point and/or volatility imposed by governmental regulations and original equipment manufacturers. The ability of solvent refining alone to economically meet these increased demands for higher basestock quality is limited. Even with the use of additives, formulated oils require higher basestock quality to meet the demands of modern engines. Also, the supply of crudes that are rich in paraffins, is limited.

Catalytic dewaxing has developed as an alternative to solvent based methods for producing high quality basestocks. Dewaxing catalysts function by two different mechanisms: those catalysts which function primarily by isomerization and those catalysts which function primarily by hydrocracking. There are few, if any, dewaxing catalysts with the ability to function solely by one mechanism to the exclusion of the other. Dewaxing by hydrocracking can be done with relatively low quality feedstocks. However, these feeds typically require more severe reaction conditions to achieve target basestock quality and this leads to lower basestock yields and further processing steps to mitigate undesirable species formed by hydrocracking.

Dewaxing catalysts which function primarily by isomerization convert waxy molecules into branched chain molecules. Branched chain molecules can have desirable properties with regard to VI and pour point. ZSM-48 is an example of such a dewaxing catalyst. As noted in U.S. Pat. No. 5,075,269, ZSM-48 is prepared using diquaternary ammonium compounds as directing agents. Both the directing agent and the silica-alumina ratio can influence crystal morphology, although the choice of directing agent is the greater factor. When using a diamine or tetraamine directing agent, rod- or needle-like crystals are produced. At high silica:alumina ratios using a diquaternary ammonium directing agent, the ZSM-48 produced has a platelet morphology. As the silica: alumina ratio is lowered using the preparative techniques described in U.S. Pat. No. 5,075,269 or U.S. Pat. No. 6,923, 949, crystal purity becomes an increasing problem as competing crystalline forms other than ZSM-48 are produced, or the ZSM-48 contains heterostructural zeolite seeds.

It is known that crystal morphology can affect catalyst behavior, especially with regard to catalyst activity and stability. Also, it is generally desirable to have a small crystallite size as smaller crystals likewise favor higher activity and stability due to greater surface area for given amount of catalyst.

It would be highly advantageous to have ZSM-48 crystals that could be made with high purity and that would have high activity when used as a catalyst while exhibiting a favorable morphology.

SUMMARY OF THE INVENTION

In an embodiment, the invention relates to a high purity ZSM-48 composition that is free of non-ZSM-48 seed crystals and ZSM-50. In various embodiments the ZSM-48 crystals can be as-synthesized, H-form, or Na-form crystals. Optionally, the composition can contain Kenyaite, or preferably the composition is free of Kenyaite. In another embodiment, the ZSM-48 composition is free of other non-ZSM-48 crystals. In still another embodiment, the ZSM-48 composition is free of crystals having a fibrous morphology. In yet another embodiment, the ZSM-48 composition can optionally contain needle-like crystals. Preferably, the ZSM-48 composition is free of needle-like crystals.

In another embodiment, the invention provides a method for making as-synthesized ZSM-48 crystals containing a hexamethonium structure directing agent, wherein the as-synthesized ZSM-48 crystals are free of ZSM-50 and non-ZSM-48 seed crystals. The method includes preparing an aqueous mixture of silica or silicate salt, alumina or aluminate salt, hexamethonium salt and alkali base. The mixture has the following molar ratios: silica:alumina from 70 to 110, base: silica from 0.1 to 0.3 and hexamethonium salt:silica from 0.01 to 0.05. Preferably, the base:silica ratio is from 0.14 to 0.18. Preferably, the hexamethonium salt:silica ratio is 0.015 to 0.025. The prepared mixture is heated with stirring for a time and temperature sufficient for crystal formation.

In a further embodiment, a method is provided for dewaxing a hydrocarbon feedstock. The method includes contacting the feedstock with ZSM-48 catalyst according to an embodiment of the invention under catalytic dewaxing conditions to produce a dewaxed feedstock. The catalyst comprises ZSM-48 crystals having a silica:alumina molar ratio of from 70 to 110 and being free of non-ZSM-48 seed crystals and ZSM-50.

DETAILED DESCRIPTION OF THE INVENTION

The invention relates to high purity ZSM-48 crystals in a particular morphology free of non-ZSM-48 seed crystals and free of ZSM-50, and a method of making the ZSM-48 composition. The ZSM-48 crystals can be can be "as-synthesized" crystals that still contain the organic template, or the crystals can be calcined crystals, such as Na-form ZSM-48 crystals, or the crystals can be calcined and ion-exchanged crystals, such as H-form ZSM48 crystals. By "free of non-ZSM-48 seed crystals" is meant that the reaction mixture used for forming the ZSM-48 does not contain non-ZSM-48 seed crystals. Instead, ZSM-48 crystals synthesized according to the invention are either synthesized without the use of seed crystals, or with ZSM-48 seed crystals for seeding. By "free of Kenyaite and ZSM-50" is meant that Kenyaite and ZSM-50, if any, are present in amounts that are not detectable by X-ray diffraction. Similarly, the high purity ZSM-48 according to the invention is also free of other non-ZSM-48 crystals to the degree that such other crystals are also not detectable by X-ray diffraction. This non-detectable determination was made on a Bruker D4 Endeavor instrument, manufactured by Bruker AXS, and equipped with a Vantec-1 high-speed detector. The instrument was run using a silicon powder standard (Nist 640B) which is a material without stress. The full-width half-maximum (fwhm) for the standard peak at 28.44 degrees 2 theta is 0.132. The step size is 0.01794 degrees and the time/step is 2.0 seconds. The 2 theta scan used a Cu target at 35 kv and 45 ma. By "free of fibrous crystals" and "free of needle-like crystals" is meant that the fibrous and/or needle-like crystals, if any, are present in amounts that are not detectable by Scanning Electron Microscopy (SEM). Photomicrographs from SEM can be used to identify crystals with different morphologies. The resolution scale (1 µm) is shown on the photomicrographs in the present figures.

The X-ray diffraction pattern (XRD) of the ZSM-48 crystals according to the invention is that exhibited by ZSM-48, i.e., the D-spacings and relative intensities correspond to those of pure ZSM-48. While XRD can be used to establish the identity of a given zeolite, it cannot be used to distinguish a particular morphology. For example, the needle-like and platelet forms for a given zeolite will exhibit the same diffraction patterns. In order to distinguish between different morphologies, it is necessary to use an analytical tool with greater resolution. An example of such a tool is scanning electron microscopy (SEM). Photomicrographs from SEM can be used to identify crystals with different morphologies.

The ZSM-48 crystals after removal of the structural directing agent have a particular morphology and a molar composition according to the general formula:

$$(n)SiO_2:Al_2O_3$$

where n is from 70 to 110, preferably 80 to 100, more preferably 85 to 95. In another embodiment, n is at least 70, or at least 80, or at least 85. In yet another embodiment, n is 110 or less, or 100 or less, or 95 or less. In still other embodiments, Si may be replaced by Ge and Al may be replaced by Ga, B, Fe, Ti, V, and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05, or less than 0.025, or less than 0.022. In another embodiment, the molar ratio of structural directing agent:silica in the mixture is at least 0.01, or at least 0.015, or at least 0.016. In still another embodiment, the molar ratio of structural directing agent:silica in the mixture is from 0.015 to 0.025, preferably 0.016 to 0.022. In an embodiment, the as-synthesized form of ZSM-48 crystals has a silica:alumina molar ratio of 70 to 110. In still another embodiment, the as-synthesized form of ZSM-48 crystals has a silica:alumina molar ratio of at least 70, or at least 80, or at least 85. In yet another embodiment, the as-synthesized form of ZSM-48 crystals has a silica:alumina molar ratio of 110 or less, or 100 or less, or 95 or less. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 zeolite in either a calcined or as-synthesized form typically forms agglomerates of small crystals that may have crystal sizes in the range of about 0.01 to about 1 µm. These small crystals are desirable for they generally lead to greater activity. Smaller crystals mean greater surface area which leads to a greater number of active catalytic sites per given amount of catalyst. Preferably, the ZSM-48 crystals in either a calcined or as-synthesized form have a morphology containing no fibrous crystals. By fibrous is meant crystals that have a L/D ratio of >10/1, where L and D represent the length and diameter of the crystal. In another embodiment, the ZSM-48 crystals in either a calcined or as-synthesized form have a low quantity or are free of needle-like crystals. By needle-like is meant crystals that have a L/D ratio of <10/1, preferably less than 5/1, more preferably between 3/1 and 5/1. The SEM shows that crystals prepared according to the methods herein have no detectable crystals having a fibrous or needle-like morphology. This morphology alone or coupled with the low silica:alumina ratios leads to catalysts having high activity as well as desirable environmental features.

The ZSM-48 composition is prepared from an aqueous reaction mixture comprising silica or silicate salt, alumina or soluble aluminate salt, base and directing agent. To achieve the desired crystal morphology, the reactants in reaction mixture have the following molar ratios:

$SiO_2:Al_2O_3$=70 to 110

$H_2O:SiO_2$=1 to 500

$OH^-:SiO_2$=0.1 to 0.3

$OH^-:SiO_2$ (preferred)=0.14 to 0.18 template:$SiO_2$=0.01–0.05 template:$SiO_2$ (preferred)=0.015 to 0.025

In the above ratios, two ranges are provided for both the base:silica ratio and the structure directing agent:silica ratio. The broader ranges for these ratios include mixtures that result in the formation of ZSM-48 crystals with some quantity of Kenyaite and/or needle-like morphology. For situations where Kenyaite and/or needle-like morphology is not desired, the preferred ranges should be used, as is further illustrated below in the Examples.

The silica source is preferably precipitated silica and is commercially available from Degussa. Other silica sources include powdered silica including precipitated silica such as Zeosil® and silica gels, silicic acid colloidal silica such as Ludox® or dissolved silica. In the presence of a base, these other silica sources may form silicates. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like.

The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In the synthesis of the ZSM-48 crystals, the reactants including silicate salt, aluminate salt, base and directing agent are mixed together with water in the ratios set forth above and heated with stirring at 100 to 250° C. The crystals may be formed from reactants or in the alternative, ZSM-48 seed crystals may be added to the reaction mixture. The ZSM-48 seed crystals may be added to enhance the rate of crystal formation but do not otherwise affect crystal morphology. The preparation is free of other non-ZSM-48 types of seed crystals such as zeolite Beta. The ZSM-48 crystals are purified, usually by filtration, and washed with deionized water.

In an embodiment, the crystals obtained from the synthesis according to the invention have a composition that is free of non ZSM-48 seed crystals and free of ZSM-50. Preferably, the ZSM-48 crystals will have a low quantity of Kenyaite. In an embodiment, the amount of Kenyaite can be 5% or less, or 2% or less, or 1% or less. In an alternative embodiment, the ZSM-48 crystals can be free of Kenyaite.

In an embodiment, the crystals obtained from the synthesis according to the invention have a morphology that is free of fibrous morphology. Fibrous morphology is not desired, as this crystal morphology inhibits the catalytic dewaxing activity of ZSM-48. In another embodiment, the crystals obtained from the synthesis according to the invention have a morphology that contains a low percentage of needle-like morphology. The amount of needle-like morphology present in the ZSM-48 crystals can be 10% or less, or 5% or less, or 1% or less. In an alternative embodiment, the ZSM-48 crystals can be free of needle-like morphology. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the invention should be employed. Additionally, if a composition free of Kenyaite and/or free of needle-like morphology is desired, the preferred ranges should be used.

According to U.S. Pat. No. 6,923,949, heterostructural, non-ZSM-48 seeding is used to prepare ZSM-48 crystals having a silica:alumina ratio less than 150:1. According to U.S. Pat. No. 6,923,949, the preparation of pure ZSM-48 with silica:alumina ratios down to 50:1 or less is dependent on the use of heterostructural seeds such as zeolite Beta seeds.

If heterogeneous seed crystals are not used, as one synthesizes ZSM-48 with increasingly lower silica:alumina ratios, the formation of the impurity ZSM-50 becomes more of a factor. Ratios of directing agent:silica greater than about 0.025 typically produce mixed phase aggregates containing needle-like crystals. Preferably, the ratio of directing agent:silica is about 0.022 or less. Ratios of directing agent: silica below about 0.015 begin to produce a product containing Kenyaite. Kenyaite is an amorphous layered silicate and is a form of natural clay. It does not exhibit zeolite type activity. Instead, it is relatively inert in the presence of reaction conditions typically present when a feedstock is exposed to ZSM-48. Thus, while the presence of Kenyaite in a ZSM-48 sample is tolerable in some applications, the presence of Kenyaite tends to reduce the overall activity of the ZSM-48. Ratios of hydroxide:silica (or other base:silica) and silica:alumina ratios are also important to the morphology of the crystals formed as well as to purity of crystals formed. Ratios of silica:alumina are also important to catalyst activity. The base:silica ratio is a factor affecting the formation of Kenyaite. The use of a hexamethonium directing agent is a factor for the production of a product not containing a fibrous material. The formation of needle-like morphology is a function of the silica:alumina ratio and structure directing agent:silica ratio.

The as-synthesized ZSM-48 crystals should be at least partially dried prior to use or further treatment. Drying may be accomplished by heating at temperatures of from 100 to 400° C., preferably from 100 to 250° C. Pressures may be atmospheric or subatmospheric. If drying is performed under partial vacuum conditions, the temperatures may be lower than those at atmospheric pressures Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. The bound ZSM-48 may range from 10 to 100 wt. % ZSM-48, based on bound ZSM-48 with the balance being binder.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 to 5 wt. %, based on catalyst. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be steamed prior to use.

ZSM-48 catalysts are useful as dewaxing catalysts for hydrocarbon feedstocks. A preferred feedstock is a lube oil basestock. Such feedstocks are wax-containing feeds that boil in the lubricating oil range, typically having a 10% distillation point greater than 650° F. (343° C.), measured by ASTM D 86 or ASTM D2887, and are derived from mineral or synthetic sources. The feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

Feedstocks may have high contents of nitrogen- and sulfur-contaminants. Feeds containing up to 0.2 wt. % of nitrogen, based on feed and up to 3.0 wt. % of sulfur can be processed in the present process. Sulfur and nitrogen contents may be measured by standard ASTM methods D5453 and D4629, respectively.

The feedstocks may be hydrotreated prior to dewaxing. For hydrotreating, the catalysts are those effective for hydrotreating such as catalysts containing Group 6 metals (based on the IUPAC Periodic Table format having Groups from 1 to 18), Groups 8-10 metals, and mixtures thereof. Preferred metals include nickel, tungsten, molybdenum, cobalt and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst. Suitable metal oxide supports include oxides such as silica, alumina, silica-aluminas or titania, preferably alumina. Preferred aluminas are porous aluminas such as gamma or eta. The amount of metals, either individually or in mixtures, ranges from about 0.5 to 35 wt. %, based on the catalyst. In the case of preferred mixtures of groups 9-10 metals with group 6 metals, the groups 9-10 metals are present in amounts of from 0.5 to 5 wt. %, based on catalyst and the group 6 metals are present in amounts of from 5 to 30 wt. %. The amounts of metals may be measured by methods specified by ASTM for individual metals including atomic absorption spectroscopy or inductively coupled plasma-atomic emission spectrometry.

Hydrotreating conditions include temperatures of up to 426° C., preferably from 150 to 400° C., more preferably 200 to 350° C., a hydrogen partial pressure of from 1480 to 20786 kPa (200 to 3000 psig), preferably 2859 to 13891 kPa (400 to 2000 psig), a space velocity of from 0.1 to 10 hr.$^{-1}$, preferably 0.1 to 5 hr.$^{-1}$, and a hydrogen to feed ratio of from 89 to 1780 m$^3$/m$^3$ (500 to 10000 scf/B), preferably 178 to 890 m$^3$/m$^3$.

Dewaxing conditions include temperatures of up to 426° C., preferably from 250-400° C., more preferably 275 to 350° C., pressures of from 791 to 20786 kPa (100 to 3000 psig), preferably 1480 to 17339 kPa (200 to 2500 psig), liquid hourly space velocities of from 0.1 to 10 hr.$^{-1}$, preferably 0.1 to 5 hr.$^{-1}$ and hydrogen treat gas rates from 45 to 1780 m$^3$/m$^3$ (250 to 10000 scf/B), preferably 89 to 890 m$^3$/m$^3$ (500 to 5000 scf/B).

The dewaxed basestock may be hydrofinished. It is desired to hydrofinish the product resulting from dewaxing in order to adjust product qualities to desired specifications. Hydrofinishing is a form of mild hydrotreating directed to saturating any lube range olefins and residual aromatics as well as to removing any remaining heteroatoms and color bodies. The post dewaxing hydrofinishing is usually carried out in cascade with the dewaxing step. Generally the hydrofinishing will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 hr.$^{-1}$, preferably 0.5 to 3 hr.$^{-1}$ and hydrogen treat gas rates of from 44.5 to 1780 m$^3$/m$^3$ (250 to 10,000 scf/B).

Hydrofinishing catalysts are those containing Group 6 metals (based on the IUPAC Periodic Table format having Groups from 1 to 18), Groups 8-10 metals, and mixtures thereof. Preferred metals include at least one noble metal having a strong hydrogenation function, especially platinum, palladium and mixtures thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatics saturation will comprise at least one metal having relatively strong hydrogenation function on a porous support. Typical support materials include amorphous or crystalline oxide materials such as alumina, silica, and silica-alumina. The metal content of the catalyst is often as high as about 20 weight percent for non-noble metals. Noble metals are usually present in amounts no greater than about 1 wt. %. A preferred hydrofinishing catalyst is a mesoporous material belonging to the M41S class or family of catalysts. The M41S family of catalysts are mesoporous materials having high silica contents whose preparation is further described in J. Amer. Chem. Soc., 1992, 114, 10834. Examples included MCM-41, MCM-48 and MCM-50. Mesoporous refers to catalysts having pore sizes from 15 to 100 Angstroms. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from 15 to 100 Angstroms. MCM-48 has a cubic symmetry and is described for example is U.S. Pat. No. 5,198, 203 whereas MCM-50 has a lamellar structure. MCM-41 can be made with different size pore openings in the mesoporous range. The mesoporous materials may bear a metal hydrogenation component, which is at least one of Group 8, Group 9 or Group 10 metals. Preferred are noble metals, especially Group 10 noble metals, most preferably Pt, Pd or mixtures thereof.

ZSM-48 crystals made according to the invention have a relatively low silica:alumina ratio. This lower silica:alumina ratio mean that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

In addition to the embodiments described above, in still another embodiment, the invention relates to high purity ZSM-48 composition having a silica:alumina molar ratio of from 70 to 110, the ZSM-48 being free of non-ZSM-48 seed crystals and fibrous crystals. Preferably, the ZSM-48 crystals also have a low content or are free of needle-like crystals. Another embodiment relates to a ZSM-48 crystals which in an as-synthesized form comprise ZSM-48 having a silica: alumina molar ratio of from 70 to 110 and are formed from a reaction mixture containing a hexamethonium directing agent in a hexamethonium:silica molar ratio from 0.01 to 0.05, preferably from 0.015 to 0.025. In this embodiment, the as-synthesized ZSM-48 crystals are free of non-ZSM-48 seed crystals and fibrous crystals. Preferably, the ZSM-48 crystals also have a low content of needle-like crystals or are free of needle-like crystals.

In still a further embodiment, the as-synthesized ZSM-48 crystals are calcined thereby removing the hexamethonium structure directing agent to form high purity Na-form ZSM-48. This Na-form ZSM-48 can also be ion exchanged to form H-form ZSM-48. In still another embodiment, the as-synthesized form of ZSM-48 crystals or the calcined ZSM-48 (Na-form or H-form) is combined with at least one of a binder and hydrogenation metal.

In yet another embodiment, the invention relates to a method for making ZSM-48 crystals which comprises: preparing an aqueous mixture of silica or silicate salt, alumina or aluminate salt, hexamethonium salt and alkali base wherein the mixture has the following molar ratios: silica:alumina from 70 to 110, base:silica from 0.1 to 0.3, preferably from 0.14 to 0.18 and hexamethonium salt:silica from 0.01 to 0.05, preferably from 0.015 to 0.025; heating the mixture with stirring for a time and temperature sufficient for crystal formation. Optionally, seed crystals of ZSM-48 can be added to the reaction mixture. The above procedure results in as-synthesized ZSM-48 crystals that contain the hexamethonium structure directing agent.

This invention is further illustrated by the following examples.

EXAMPLE 1

A mixture was prepared from 1200 g of water, 40 g of hexamethonium chloride (56% solution), 228 g of Ultrasil PM (a precipitated silica powder from Degussa), 12 g of sodium aluminate solution (45%), and 40 g of 50% sodium hydroxide solution. The mixture had the following molar composition:

$SiO_2/Al_2O_3=106$ $H_2O/SiO_2=20.15$ $OH^-/SiO_2=0.17$ $Na^+/SiO_2=0.17$

Template/$SiO_2=0.023$

Figure 1:
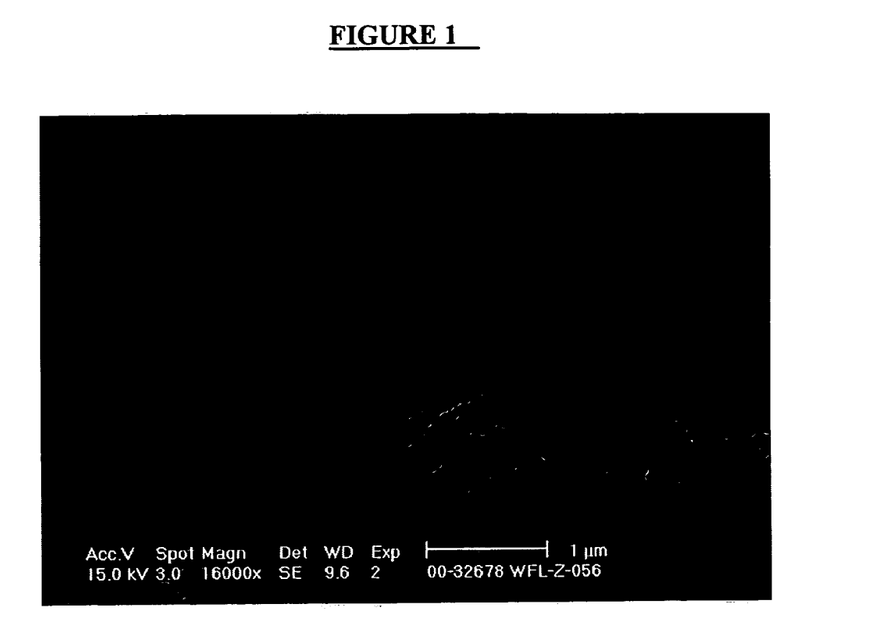
FIG. 1 is a photomicrograph of the ZSM-crystals prepared at a template:silica ratio of 0.023 and showing the presence of some needle like crystals.

The mixture was reacted at 320° F. (160° C.) in a 2-liter autoclave with stirring at 250 RPM for 48 hours. Those of skill in the art will recognize that factors such as the size of the autoclave and the type of stirring mechanism can make other stirring speeds and times desirable. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of crystals with mixed morphologies (needle-like and irregularly shaped crystals). The resulting ZSM-48 crystals had a $SiO_2/Al_2O_3$ molar ratio of ~100/1. FIG. 1 is a photomicrograph of the ZSM-48 crystals. This comparative example at template:silica ratio of 0.023 shows the presence of some needle-like crystals.

EXAMPLE 2

A mixture was prepared from water, hexamethonium chloride (56% solution), Ultrasil PM, sodium aluminate solution (45%), and 50% sodium hydroxide solution. The prepared mixture had the following molar composition:

$SiO_2/Al_2O_3=106$ $H_2O/SiO_2=20.15$ $OH^-/SiO_2=0.17$ $Na^+/SiO_2=0.17$

Template/$SiO_2=0.018$

Figure 2:
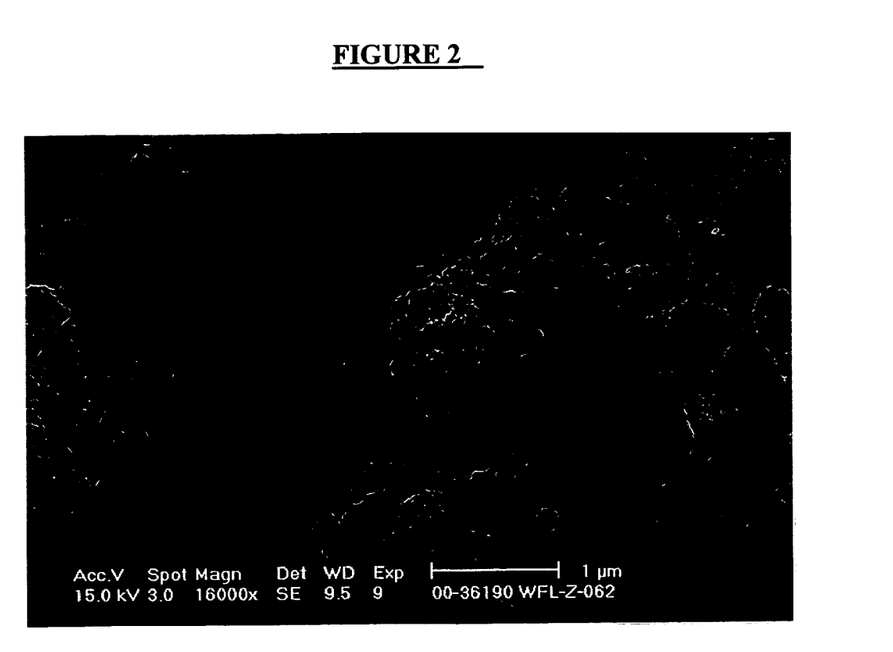
FIG. 2 is a photomicrograph showing the absence of needle-like crystals for ZSM-48 crystals prepared from a reaction mixture having a template:silica ratio of 0.018.

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of small irregularly shaped crystals (with an average crystal size of about 0.05 microns). The resulting ZSM-48 crystals had a $SiO_2/Al_2O_3$ molar ratio of ~94/1. FIG. 2 is a photomicrograph of the resulting ZSM-crystals. FIG. 2 shows the absence of needle-like crystals for ZSM-48 according to the invention.

EXAMPLE 3

A mixture was prepared from water, hexamethonium chloride (56% solution), Ultrasil Modified, sodium aluminate solution (45%), 50% sodium hydroxide solution, and 5 wt % (relative to the silica charge) of ZSM-48 seed crystals. The mixture had the following molar composition:

$SiO_2/Al_2O_3=103$ $H_2O/SiO_2=14.8$ $OH^-/SiO_2=0.17$ $Na^+/SiO_2=0.17$

Template/$SiO_2=0.029$

Figure 3:
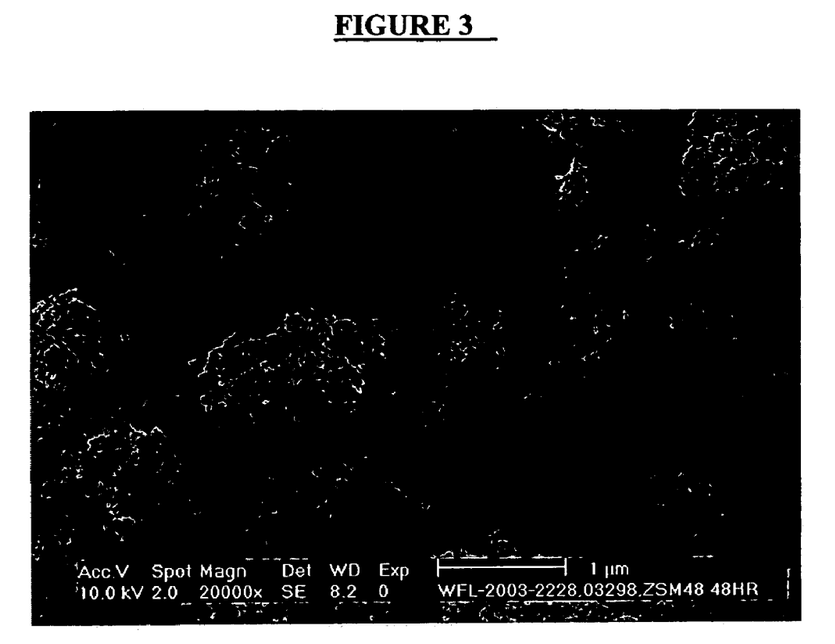
FIG. 3 is a photomicrograph showing the presence of needle-like crystals for ZSM-48 crystals prepared from a reaction mixture having a template:silica ratio of 0.029.

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of elongated (needle-like) crystals (with an average crystal size of <1 microns). The resulting ZSM-48 crystals had a $SiO_2/Al_2O_3$ molar ratio of ~95/1. FIG. 3 is a photomicrograph of the resulting ZSM-crystals. This comparative example shows the presence of needle-like crystals for ZSM-48 synthesized from a reaction mixture having a template:silica ratio of 0.029.

EXAMPLE 4

A mixture was prepared from water, hexamethonium chloride (56% solution), Ultrasil Modified, sodium aluminate solution (45%), 50% sodium hydroxide solution, and 5 wt % (relative to the silica charge) of ZSM-48 seed crystals. The mixture had the following molar composition:

$SiO_2/Al_2O_3=103$ $H_2O/SiO_2=14.7$ $OH^-/SiO_2=0.17$ $Na^+/SiO_2=0.17$

Template/$SiO_2=0.019$

Figure 4:
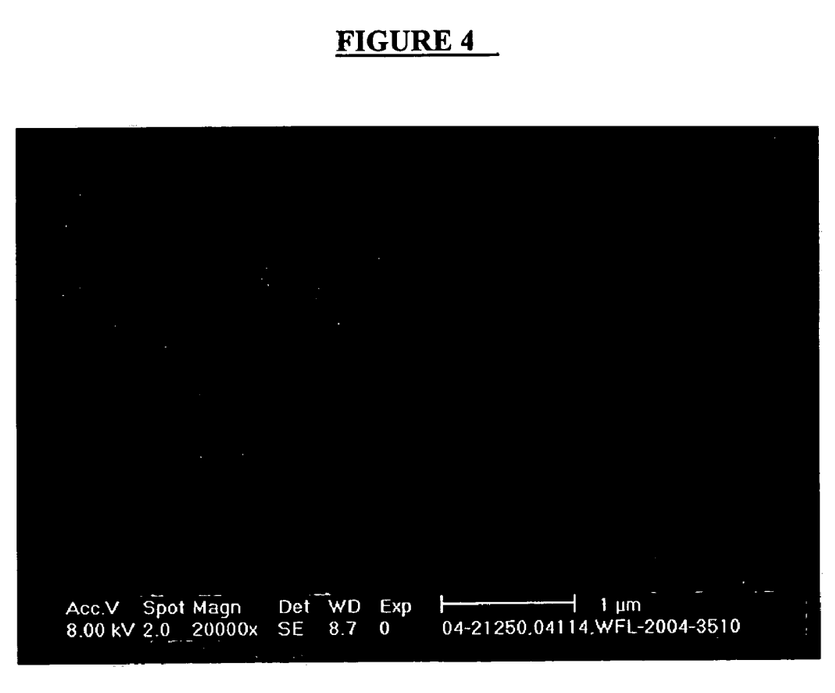
FIG. 4 is a photomicrograph showing the absence of needle-like crystals for ZSM-48 crystals prepared from a reaction mixture having a template:silica ratio of 0.019.

The mixture was reacted at 320° F. (160° C.) in an autoclave with stirring at 250 RPM for 24 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of small irregularly shaped crystals (with an average crystal size of about 0.05 microns). The resulting ZSM-48 crystals had a $SiO_2/Al_2O_3$ molar ratio of 89. FIG. 4 is a photomicrograph of the resulting ZSM-crystals. This example of ZSM-48 crystals according to the invention shows the absence of needle-like crystals.

EXAMPLE 5

A mixture was prepared from water, hexamethonium chlo-solution (45%), 50% sodium hydroxide solution, and 3.5 wt ride (56% solution), Ultrasil Modified, sodium aluminate % (relative to the silica charge) of ZSM-48 seed crystals. The mixture had the following molar composition:

$SiO_2/Al_2O_3=103$ $H_2O/SiO_2=14.6$ $OH^{31}/SiO_2=0.17$ $Na^+/SiO_2=0.17$

Template/$SiO_2$=0.015

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the mixture of ZSM-48 and trace of Kenyaite impurity.

EXAMPLE 6

A mixture was prepared from water, hexamethonium chloride (56% solution), Ultrasil Modified, sodium aluminate solution (45%), 50% sodium hydroxide solution, and 3.5 wt % (relative to the silica charge) of ZSM-48 seed crystals. The mixture had the following molar composition:

$SiO_2/Al_2O_3=102.4$ $H_2O/SiO_2=14.8$ $OH^-/SiO_2=0.20$ $Na^+/SiO_2=0.20$

Template/$SiO_2$=0.019

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material synthesized from a reaction mixture having a base:silica ratio of 0.20 showed the mixture of ZSM-48 and Kenyaite impurity.

EXAMPLE 7

A mixture was prepared from water, hexamethonium chloride (56% solution), Ultrasil PM, sodium aluminate solution (45%), 50% sodium hydroxide solution, and 3.5 wt % (relative to the silica charge) of ZSM-48 seed crystals. The mixture had the following molar composition:

$SiO_2/Al_2O_3=102.4$ $H_2O/SiO_2=14.8$ $OH^-/SiO_2=0.15$ $Na^+/SiO_2=0.15$

Template/$SiO_2$=0.019

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology.

EXAMPLE 8

A mixture was prepared from water, hexamethonium chloride (56% solution), Ultrasil PM, sodium aluminate solution (45%), and 50% sodium hydroxide solution. The mixture had the following molar composition:

$SiO_2/Al_2O_3=90$ $H_2O/SiO_2=20.1$ $OH^-/SiO_2=0.17$ $Na^+/SiO_2=0.17$

Template/$SiO_2$=0.025

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical ZSM-48 topology and a trace of ZSM-50 impurity was identified. The product showed the presence of some needle-like morphology.

EXAMPLE 9

65 parts (basis: calcined 538° C.) of high activity ZSM-48 crystal (Example #4) were mixed with 35 parts of pseudoboehmite alumina (basis: calcined 538° C.) in a Simpson muller. Sufficient water was added to produce an extrudable paste on a 2" Bonnot extruder. The mix of ZSM-48, pseudoboehmite alumina, and water containing paste was extruded and dried in a hotpack oven at 121° C. overnight. The dried extrudate was calcined in nitrogen @538° C. to decompose and remove the organic template. The $N_2$ calcined extrudate was humidified with saturated air and exchanged with 1 N ammonium nitrate to remove sodium (spec: <500 ppm Na). After ammonium nitrate exchange, the extrudate was washed with deionized water to remove residual nitrate ions prior to drying. The ammonium exchanged extrudate was dried at 121° C. overnight and calcined in air at 538° C. After air calcination, the extrudate was steamed for 3 hrs @900° F. The steamed extrudate was impregnated with tetrammine platinum nitrate (0.6 wt % Pt) using incipient wetness. After impregnation, the extrudate was dried overnight at 250° F. and calcined in air at 360° C. to convert the tetrammine nitrate salt to platinum oxide.

EXAMPLE 10

Figure 5:
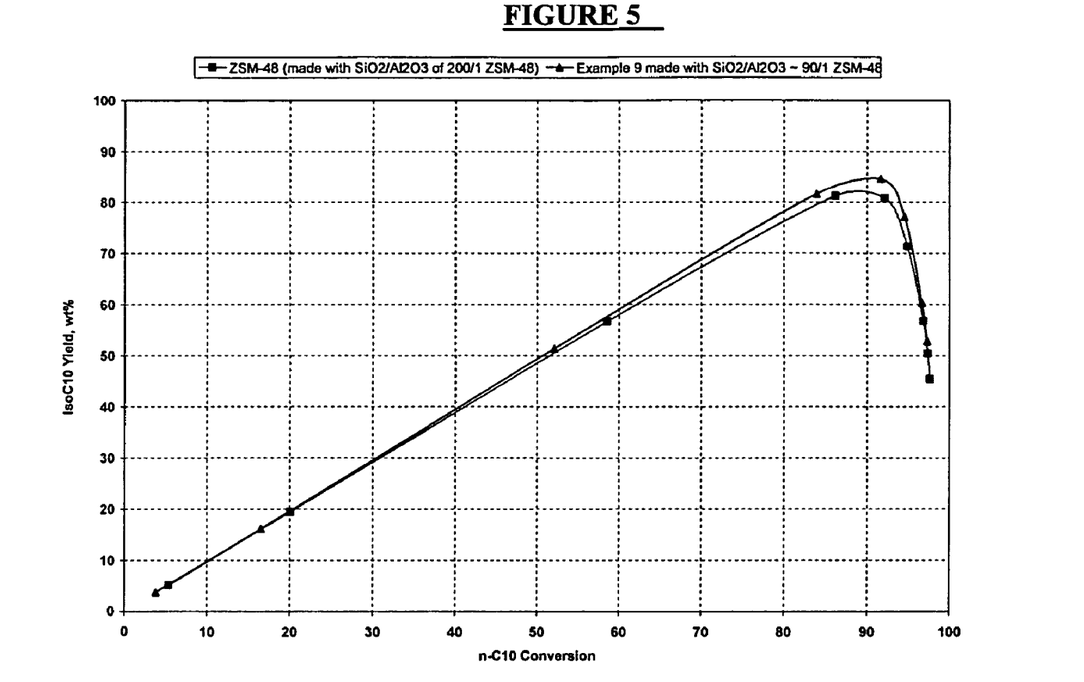
FIG. 5 is a graph showing iso-C10 yield as a function of n-C10 conversion.

The dewaxing catalyst of Example 9 was tested in a n-$C_{10}$ hydroisomerization test. Catalyst temperatures were varied from 162 to 257° C. under flowing $H_2$ (100 sccm) at 1 atm pressure to adjust n-$C_{10}$ conversions from 0 to 95%+. The high activity ZSM-48 containing catalyst showed excellent iso-$C_{10}$ yields with minimal cracking as a function of n-$C_{10}$ conversion and reaction temperature. FIG. 5 is a graph showing iso-$C_{10}$ yield as a function of n-$C_{10}$ conversion for a catalyst according to an embodiment of the invention and a catalyst with a silica:alumina ratio of about 200.

EXAMPLE 11

This example relates to the preparation of HA-ZSM-48 with seeding with regular ZSM-48 crystals. A mixture was prepared using water, hexamethonium chloride (56% solution), Ultrasil PM, sodium aluminate solution (45%), and 50% sodium hydroxide solution. About 5 wt % (relative to the silica charge) of ZSM-48 seed was then added the mixture.

The mixture had the following molar composition:

SiO$_2$/Al$_2$O$_3$=103

H$_2$O/SiO$_2$=14.7

OH$^-$/SiO$_2$=0.17

Na$^+$/SiO$_2$=0.17

Template/SiO$_2$=0.019

The mixture was reacted at 320° F. (160° C.) in an autoclave with stirring at 250 RPM for 24 hours. The product was filtered, washed with deionized (DI) water and dried at 250° F. (120° C.). The XRD pattern of the as-synthesized material shows pure phase of ZSM-48 topology. The assynthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a SiO$_2$/Al$_2$O$_3$ molar ratio of ~88.5/1.

EXAMPLE 12

This example shows the preparation of ZSM-48 with seeding using 5 wt. % (relative to the silica charge) of Beta crystals. Heterostructural seeding using Beta crystals is described in U.S. Pat. No. 6,923,949. A mixture was prepared from 1000 g of water, 25 g of hexamethonium chloride (56% solution), 190 g of Ultrasil PM (a precipitated silica powder produced from Degussa), 10 g of sodium aluminate solution (45%), and 33.3 g of 50% sodium hydroxide solution. The 10 g of Beta seed (SiO$_2$/Al$_2$O$_3$~35/1) was then added the mixture. The mixture had the following molar composition:

SiO$_2$/Al$_2$O$_3$=106

H$_2$O/SiO$_2$=20

OH$^-$/SiO$_2$=0.17

Na$^+$/SiO$_2$=0.17

Template/SiO$_2$=0.018

The mixture was reacted at 320° F. (160° C.) in a 2 liter autoclave with stirring at 250 RPM for 48 hours. The product was filtered, washed with deionized (DI) water and dried at 250° F. (120° C.). The XRD pattern of the as-synthesized material shows pure phase of ZSM-48 topology. Clearly, no Beta phase was observed on XRD pattern of the synthesized product. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a SiO$_2$/Al$_2$O$_3$ molar ratio of ~87.2.

EXAMPLE 13

This example shows the preparation of ZSM-48 using seeding with 10 wt. % (relative to the silica charge) of Beta seeds. The same reactants, formulation, and procedure as Example 2 were used, except that double amount of Beta crystals was added as seeding agent. The XRD pattern of the as-synthesized material shows pure phase of ZSM-48 topology. Clearly, no Beta phase was observed on XRD pattern of the synthesized product. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a SiO$_2$/Al$_2$O$_3$ molar ratio of ~80/1.

EXAMPLE 14

The products from Examples 11-13 were tested using a hexane adsorption test. The hexane adsorption test is a measure of the pore volume of any given catalyst. The calcined catalysts prepared as above were heated in a thermogravimetric analyzer (TGA) under nitrogen at 500° C. for 30 min. The dried catalyst was then cooled to 90° C. and exposed to n-hexane at a partial pressure of 75 torr. The weight changes as n-hexane uptake were measured by micro balance in the TGA instrument. An Alpha value was also determined for each crystal. The Alpha value for a catalyst is a standardized measure of the catalyst activity relative to the activity of a reference catalyst. The results are summarized in Table 1.

TABLE 1

| Sample | n-Hexane, (mg/g) | Estimated % Beta in product | Alpha Value |
|---|---|---|---|
| Example11, HA-ZSM-48 reaction seeded with ZSM-48 crystals | 37.7 | 0 | 70 |
| Example12: HA-ZSM-48 reaction seeded with ~5% (to silica charged) of Beta seed | 42.4 | ~5.3 | ~125 |
| Example13: HA-ZSM-48 reaction seeded with ~10% (to silica charged) of Beta seed | 48.3 | ~12 | 180 |
| Beta seed crystals used in Examples 12 & 13 | 126 | 100 | 690 |

Based on the data shown in Table 1, the added Beta seed crystals were not dissolved in the crystallization and remained in the synthesized product. The conclusion was supported by the increasing adsorption data of n-hexane on Examples 12 & 13. The conclusion is also supported by the increasing alpha value of the catalysts as the weight percentage of beta in the crystals increases. The n-hexane adsorption and alpha value increases demonstrate that the ZSM-48 crystals with a heterogeneous seed have a different reactivity than the ZSM-48 crystals with a homogeneous seed.

Note that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is conventionally known, and is described, for example, in U.S. Pat. No. 3,354,078; in the Journal of Catalysis, vol. 4, p. 527 (1965); vol. 6, p. 278 (1966); and vol. 61, p. 395 (1980).

EXAMPLE 15

Figure 6:
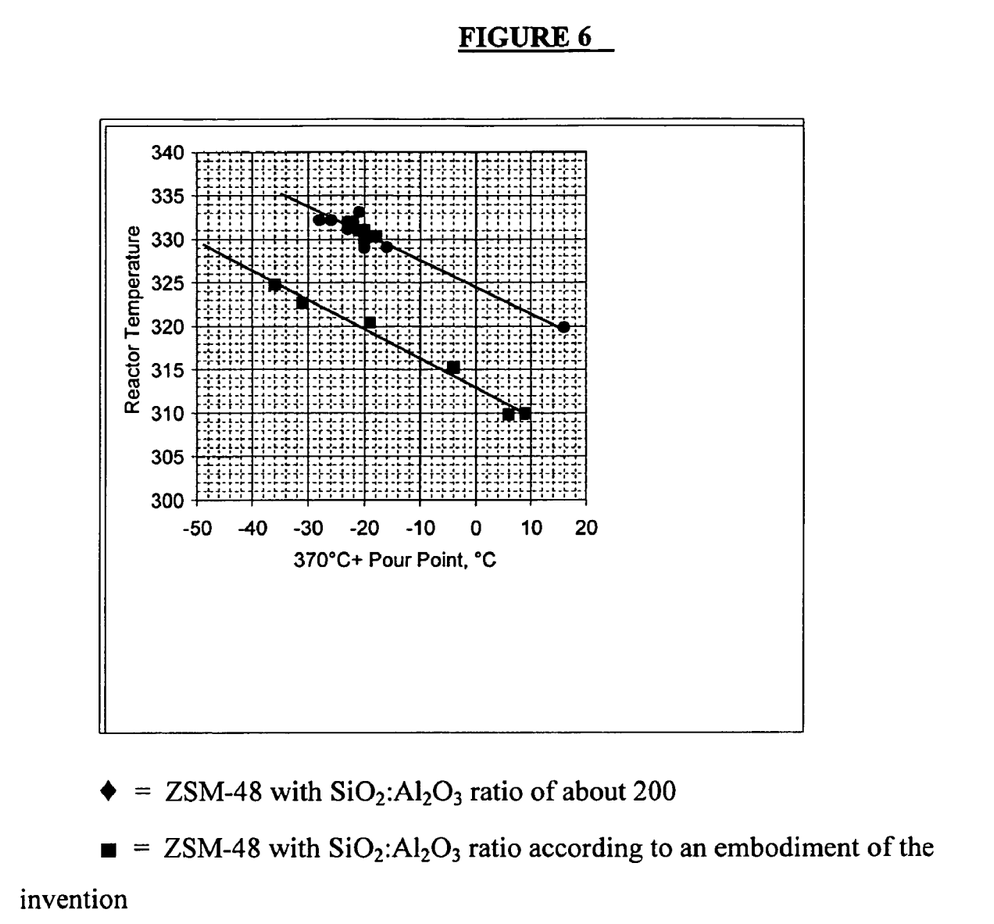
FIG. 6 is a graph showing reactor temperature vs. required temperature to meet the 370° C.+ pour point.

This example compares the activity credit for ZSM-48 according to the invention relative to a ZSM-48 with a higher silica:alumina ratio. A 600N slack wax was dewaxed at 1000 psig (6996 kPa), LHSV of 1.0 l/hr and treat gas rate of 2500 scf/B (445 m$^3$/m$^3$). FIG. 6 is a graph showing reactor temperature vs. required temperature to meet the 370° C.+ pour point. In FIG. 6, the difference between the upper line (representing ZSM-48 with a higher Silica:alumina ratio) and the lower line (ZSM-48 according to the invention) represents the activity credit.

The invention claimed is:

1. A composition comprising ZSM-48 crystals having a silica:alumina molar ratio of 110 or less that is free of non-ZSM-48 seed crystals and free of ZSM-50,
wherein the ZSM-48 crystals are free of crystals having a fibrous morphology.

2. The composition of claim 1, wherein the ZSM-48 crystals are free of crystals having a needle-like morphology.

3. The composition of claim 1, wherein the ZSM-48 crystals are free of Kenyaite.

4. The composition of claim 1, wherein the ZSM-48 crystals have a silica:alumina ratio of less than 100.

5. The composition of claim 1, wherein the ZSM-48 crystals are free of non-ZSM-48 crystals.

6. The composition of claim 1, further comprising at least one of a binder and hydrogenation metal.

7. The composition of claim 6, wherein the hydrogenation metal is a noble metal.

8. The composition of claim 1, wherein the ZSM-48 crystals are Na-form, H-form, or as-synthesized.

9. The composition of claim 1, wherein the ZSM-48 crystals are made from a mixture containing a hexamethonium structure directing agent in a structure directing agent:silica molar ratio from 0.01 to 0.05.

10. The composition of claim 9, wherein the structure directing agent:silica molar ratio in the mixture is from 0.015 to 0.025.

11. The composition of claim 1, wherein the as-synthesized ZSM-48 crystals have a silica:alumina ratio of 100 or less.

12. The composition of claim 1, wherein the as-synthesized ZSM-48 crystals have a silica:alumina ratio of at least 70.

13. A method for making as-synthesized ZSM-48 crystals containing a hexamethonium structure directing agent, wherein the as-synthesized ZSM-48 crystals are free of ZSM-50 and non-ZSM-48 seed crystals, the method comprising:
preparing an aqueous mixture of silica or silicate salt, alumina or aluminate salt, hexamethonium salt and alkali base wherein the mixture has the following molar ratios: silica:alumina from 70 to 110, base:silica from 0.1 to 0.3 and hexamethonium salt:silica from 0.01 to 0.05; and
heating the mixture with stirring for a time and temperature sufficient for crystal formation.

14. The method of claim 13, wherein the mixture has a base:silica molar ratio is from 0.14 to 0.18.

15. The method of claim 13, wherein the mixture has a hexamethonium salt:silica molar ratio is from 0.015 to 0.025.

16. The method of claim 13, wherein the as-synthesized ZSM-48 crystals are calcined to remove the hexamethonium structure directing agent.

17. The method of claim 13, wherein the as-synthesized ZSM-48 crystals are combined with at least one of a binder and metal hydrogenation component.

18. The method of claim 13, wherein the as-synthesized ZSM-48 crystals are prepared using ZSM-48 seed crystals.

19. The method of claim 13, wherein the as-synthesized ZSM-48 crystals have a silica:alumina ratio of 70-110.

* * * * *